United States Patent
Launay et al.

(10) Patent No.: US 8,189,894 B2
(45) Date of Patent: May 29, 2012

(54) METHOD TO DETECT THE AORTIC ARCH IN CT DATASETS FOR DEFINING A HEART WINDOW

(75) Inventors: Laurent Launay, St Remy les Chevreuse (FR); Thomas Deschamps, Paris (FR); Guillermo Ruiz, Paris (FR)

(73) Assignee: General Electric Company, Schenectady, NY (US)

( * ) Notice: Subject to any disclaimer, the term of this patent is extended or adjusted under 35 U.S.C. 154(b) by 859 days.

(21) Appl. No.: 12/209,980

(22) Filed: Sep. 12, 2008

(65) Prior Publication Data
US 2009/0080743 A1 Mar. 26, 2009

(30) Foreign Application Priority Data
Sep. 17, 2007 (FR) ...................... 07 57639

(51) Int. Cl.
*G06K 9/00* (2006.01)
(52) U.S. Cl. .......................... 382/131; 378/4
(58) Field of Classification Search ................ 378/4-20, 378/901; 382/128, 131
See application file for complete search history.

(56) References Cited

U.S. PATENT DOCUMENTS

| | | |
|---|---|---|
| 2003/0099385 A1 | 5/2003 | Zeng et al. |
| 2004/0101179 A1 | 5/2004 | Suryanarayanan et al. |
| 2006/0078184 A1* | 4/2006 | Shen et al. .................. 382/131 |
| 2009/0252395 A1* | 10/2009 | Chan et al. .................. 382/131 |

OTHER PUBLICATIONS

Brown, Matthew S., et al "Method for Segmenting Chest CT Image Data Using an Anatomical Model: Preliminary Results", IEEE Transactions on Medical Imaging, IEEE Service Center, Piscataway, NJ, US vol. 16, No. 6., Dec. 1, 1997., pp. 828-839.

Hu, Shiying, et al. "Automatic Lung Segmentation for Accurate Quantitation of Volumetric X-Ray CT Images", IEEE Transactions on Medical Imaging, IEEE Service Center, Piscataway, NJ, US. vol. 20, No. 6., Jun. 1, 2001, pp. 490-498.

Armato, S. G., et al "Automated Lung Segmentation for Thoracic CT—Imaging on Computer-Aided Diagnosis", Academic Radiology, Reston, VA, US, vol. 11, No. 9, Sep. 1, 2004, pp. 1011-1021.

Kovacs, Tamas, et al: "Automatic Segmentation of the Vessel Lumen from 3D CTA Images of Aortic Dissection", Bildverarbeitung fur die Medizin 2006, pp. 161-165.

* cited by examiner

*Primary Examiner* — Hoon Song
(74) *Attorney, Agent, or Firm* — Global Patent Operation; Jonathan E. Thomas

(57) ABSTRACT

A method for processing anatomic images acquired in volume by a medical imaging system. Also, a medical imaging system and a computer program, each configurable to perform this method.

23 Claims, 14 Drawing Sheets

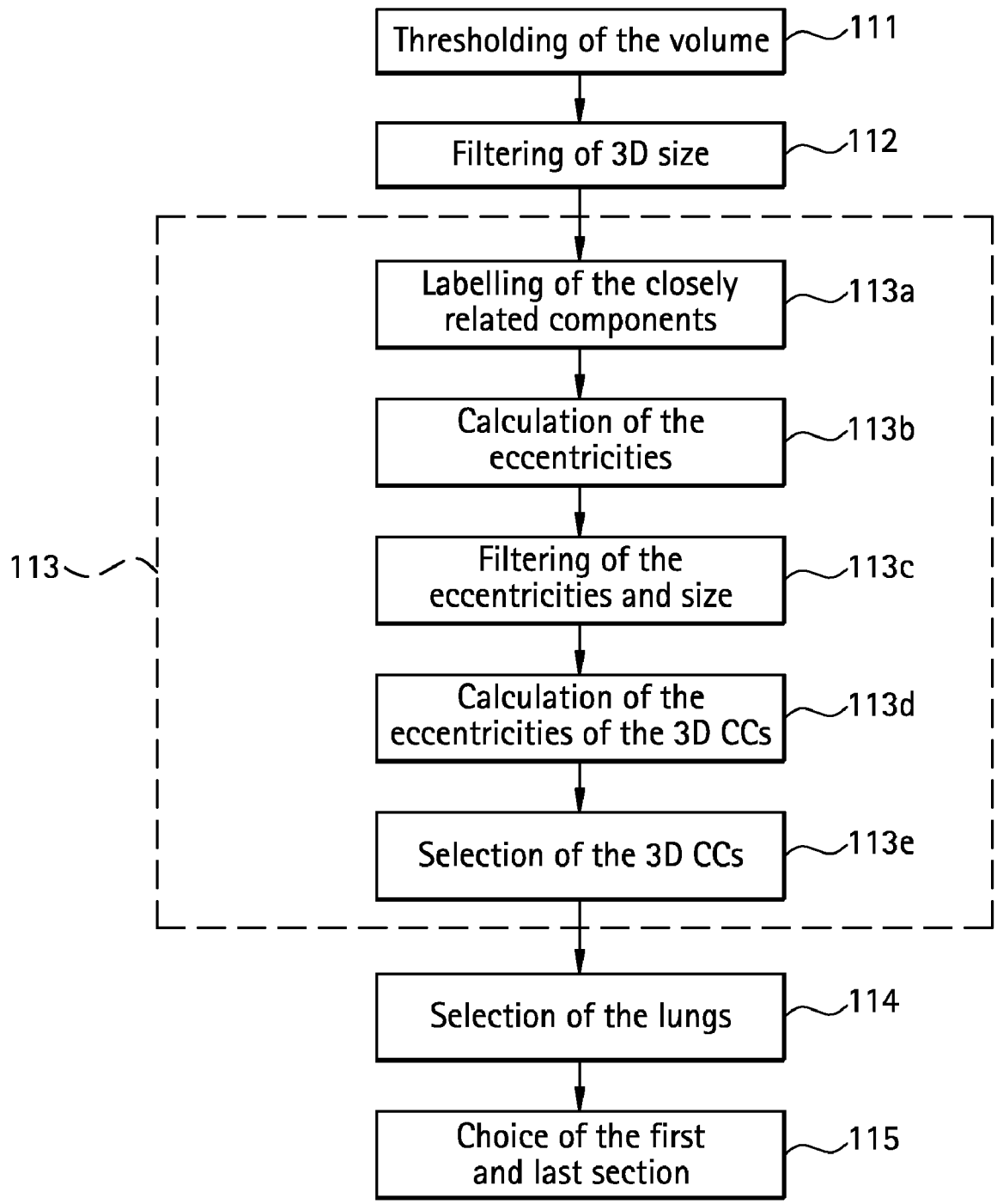

FIG. 5A
FIG. 5B
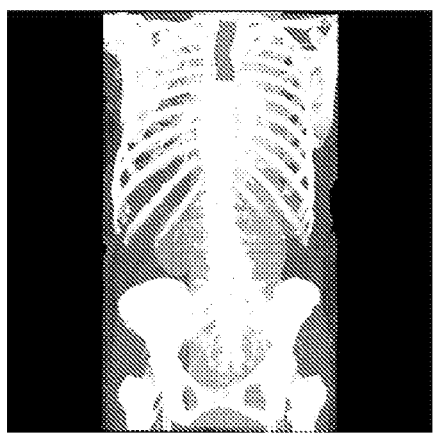
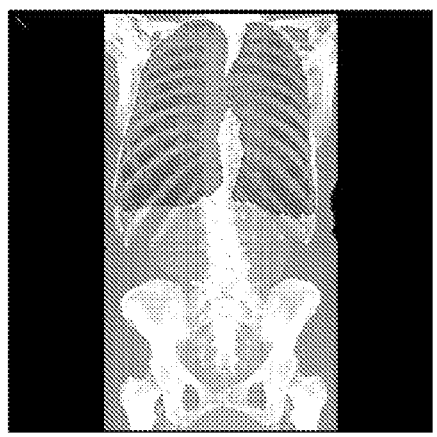
FIG. 5C
FIG. 5D
FIG. 5E
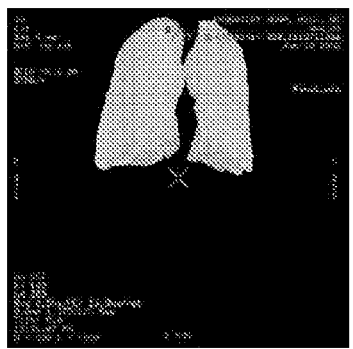
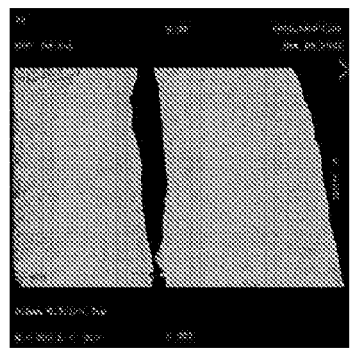
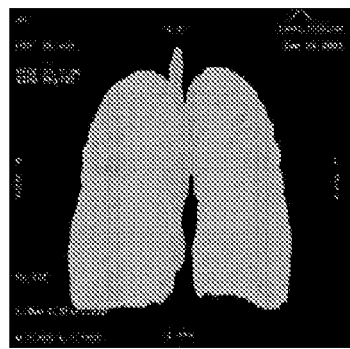

profile data ———

FIG. 13
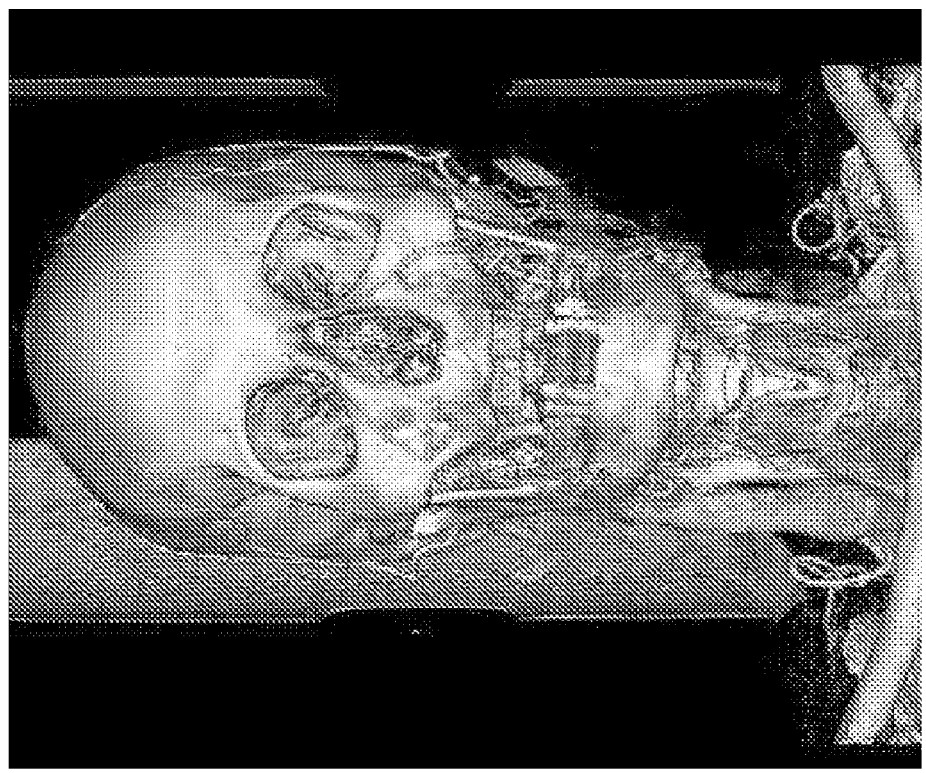
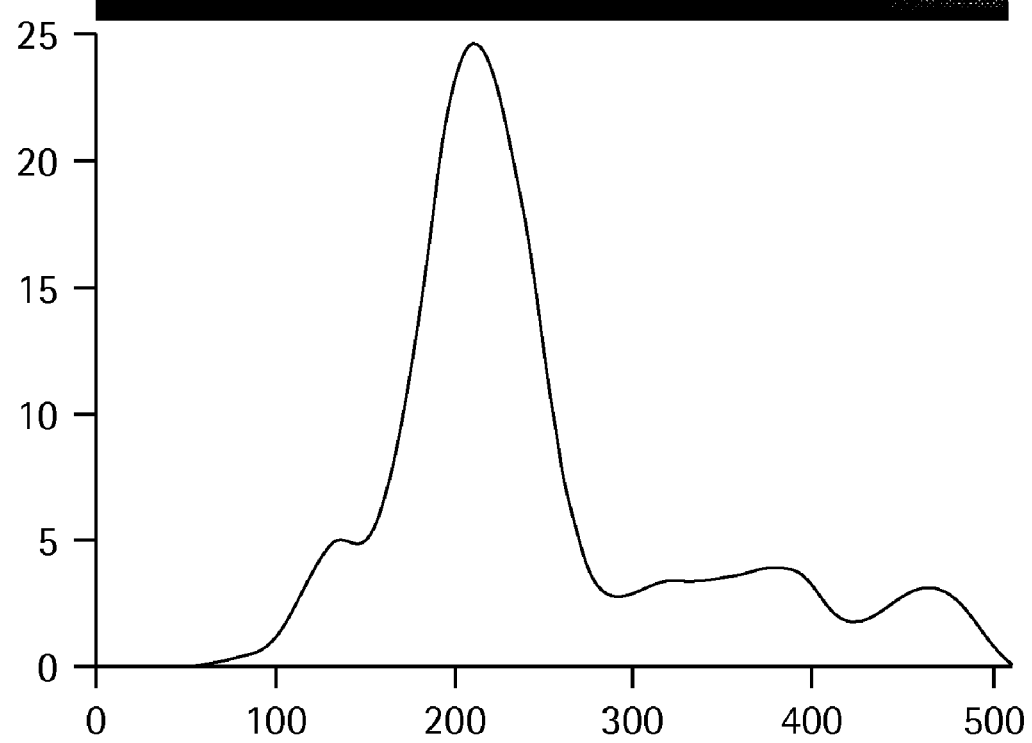

METHOD TO DETECT THE AORTIC ARCH IN CT DATASETS FOR DEFINING A HEART WINDOW

CROSS-REFERENCE TO RELATED APPLICATIONS

This application claims priority under 35 U.S.C. §119(a)-(d) to prior-filed, co-pending French patent application Ser. No. 0757639, filed on Sep. 17, 2007, which is hereby incorporated by reference in its entirety.

BACKGROUND OF THE INVENTION

1. Field of the Invention

The field of the invention relates to medical imaging, specifically to the Processing anatomic images acquired in volume.

2. Description of Related Art

Whether one uses tomographic radiography (CT scanner) or other techniques for the acquisition of images in volume, the acquisition of images may from the neck to the feet).

Thus, according to the parts of the anatomy or organs to be examined, the processing of images that is applied is often varied, with the performance of each processing being optimized for the images where only the part of the anatomy to be examined is present.

Likewise, it is desirable for the practitioner to be able to have access immediately to images corresponding exactly to the part of the anatomy that he is to examine, even if the acquisition is done by covering an anatomic zone that is larger than the one on which he would like to work.

That is why it appeared desirable to be able to segment and to automatically identify the images of different parts of the anatomy and of different organs that were the object of the imaging.

It has already been proposed in U.S. Pat. No. 1,177,453 for a method of 3D analysis of images according to which the images are partitioned into different sub-volumes in particular to allow further optimized processing.

However, the technique described in this document concerns principally the analysis of the upper part of the body.

The invention proposes processing to allow the partitioning of the principal atomic parts of a person: head, neck, thorax, lungs, heart, abdomen, lower members.

The invention also proposes processing to allow the isolation of views of certain organs of the anatomy: heart, lung, aortic arch, etc.

More particularly, a method is proposed that involves processing anatomic images acquired in volume by a system of medical imaging, to partition the images into sub-volumes corresponding to different parts of the anatomy identified on said images, wherein to effect this partitioning one processes the acquired images by identifying those on which the lungs appear, and if the lungs are identified, the upper and lower slices are determined, delimiting them according to the axis of the anatomy on which the images have been acquired, and a distance processing is applied to these images, corresponding to the anatomic zones respectively above and below these two slices.

Thus, is proposed to use the lungs as a physical reference point to partition the images. If they are not contained in the examination, their absence from the images already gives interesting information on what is possibly not present (e.g., the heart and the thorax), and thus on what it is not necessary to try to detect.

To identify the lungs on the images, one in particular applies processing designed to remove the air in the trachea on the images, according to which:

the closely related components of air that appear on the acquired images are determined, an average 3D excentricity is determined in them, a threshold the average 3D eccentricity so calculated is compared to preserve only these closely related components whose 3D eccentricity is less than a first threshold, and whose length on the z axis is greater than a second threshold, the components thus isolated are then subtracted from the images.

Likewise, when the lungs are detected, one applies processing to identify and to partition the images corresponding to the heart.

However, one first compares the length of the anatomy appearing on the images to a given threshold, the said processing being designed to identify and partition the images corresponding to the heart being applied only when said length is greater than the said threshold.

In particular, to determine the slice corresponding to the upper limit of the heart, at least three axial slices are determined on which one identifies the ascending aorta and the descending aorta.

Likewise, when the lungs are detected, an axial surface profile occupied by the voxels on the slices below the lower slice limit of the lungs is determined, and a determination is made of the presence of the abdomen and of various parts of the legs in analyzing this profile.

When the lungs are not detected, the length of the anatomy that is the object of the acquisition of the images is compared to a threshold; if this length is greater than the said threshold, an axial profile of the surface occupied by the voxels on the slices is determined, and a determination is made of the presence of the abdomen and various parts of the legs in analyzing this profile.

When the analysis of the profile does not allow determination of the presence of the abdomen and of various parts of the legs, an axial profile of the air appearing on the slices is determined, and an analysis of this profile is made to deduce from it information on the zone of the head or neck present on the images.

Moreover, when the lungs are detected, an axial profile of the air appearing on the slices above the upper slice limit of the lungs is determined; an analysis of this profile is made to deduce from it information on the zone of the head or the neck present on the images.

In particular, a comparison is made in advance to a given threshold the length of anatomy above the upper slice limit of the lungs; the determination of the axial profile of the air is applied only when the said length is greater than the said threshold.

When the lungs are not detected, the length of the anatomy that is the object of the acquisition of the images is compared to a threshold; if this length is less than the said threshold, an axial profile of the air appearing on the slices is determined, and an analysis this profile is made to deduce from it information on the zone of the head or the neck present on the images.

In addition, and independently of the procedure presented below, the invention also involves a procedure for the processing of images acquired in volume by a system of medical imaging, wherein:

the axial slices perpendicular to the axis of the anatomy are reviewed to identify an axial slice corresponding to an upper limit of the heart, on this slice two closely related components corresponding to the ascending aorta and the descending aorta are determined, the components closely related in volume that correspond to the closely related components are determined, the said components closely related in volume are combined, the centers of the closely related components that correspond to it on several axial slices are determined on the component closely related in volume thus obtained, a plan to optimize the distance with relation to the clouds of points made up by the various centers is determined.

Embodiments of the invention propose as well a system of medical imaging means for acquiring images of anatomy in volume and the means for processing these images appropriate to partitioning the images into sub-volumes corresponding to different parts of the anatomy identified on the said images, wherein said averages are composed of averages suitable for applying processing to a method of the type presented below.

It also proposes a program stored on means for being read by a computer, the program comprising data and/or instructions for implementing such a method.

BRIEF DESCRIPTION OF THE FIGURES

Other characteristics and advantages of the invention will result from the description that follows, which is purely illustrative and not limiting, and must be read in conjunction with the figures attached to them, in which:

FIG. 4 illustrates different stages of possible processing for the detection of the lungs;

FIGS. 5A to 5E are images of a slice illustrating various stages of processing of the detection of lungs from FIG. 4;

FIG. 13 illustrates the correspondence between a profile obtained from applying the processing of FIG. 12 and various bones of the lower members and of the abdomen;

DETAILED DESCRIPTION

Review of 3D Imaging Systems

Figure 1:
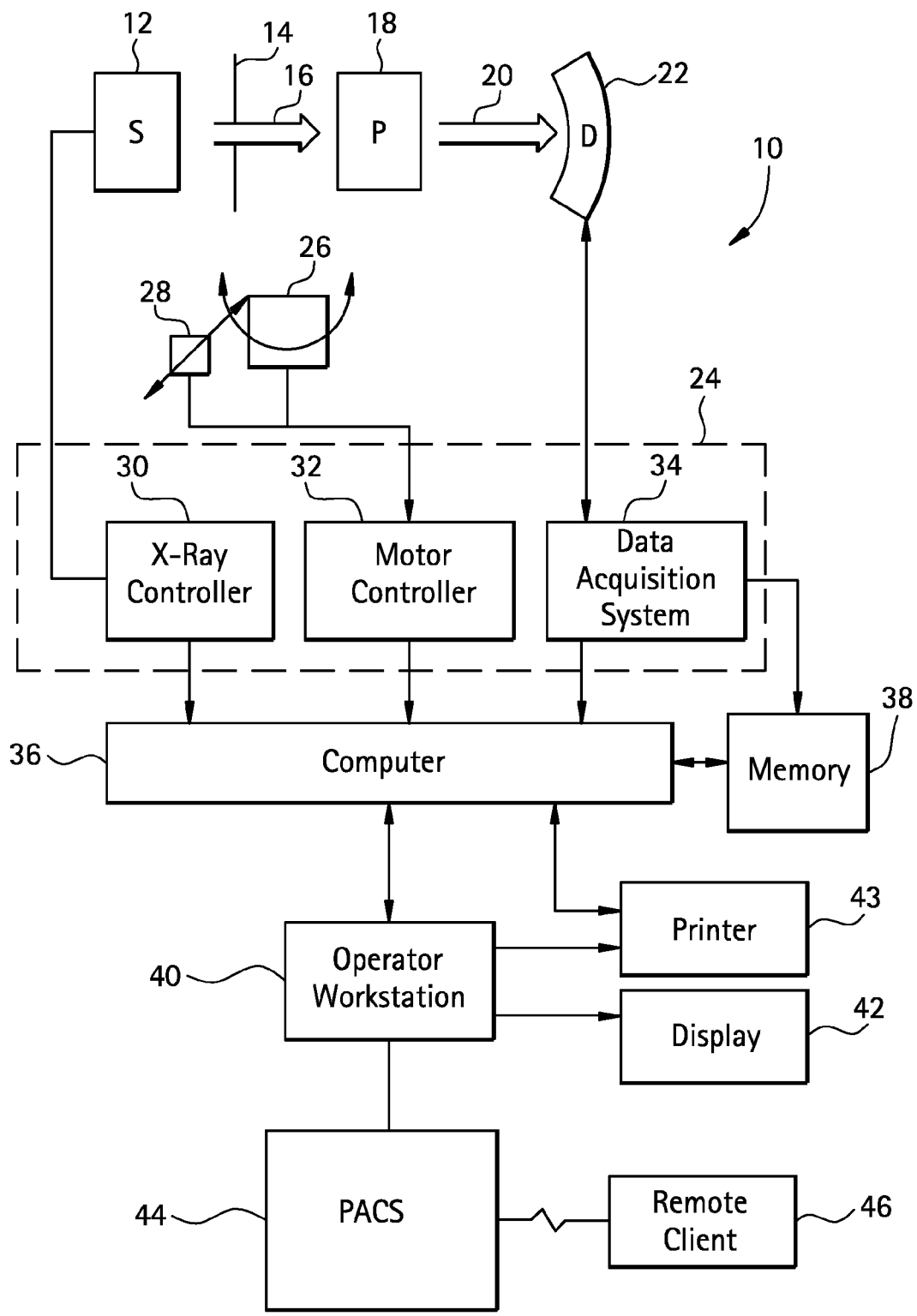
FIGS. 1 and 2 are two schematic representations of a CT imaging system.
Figure 2:
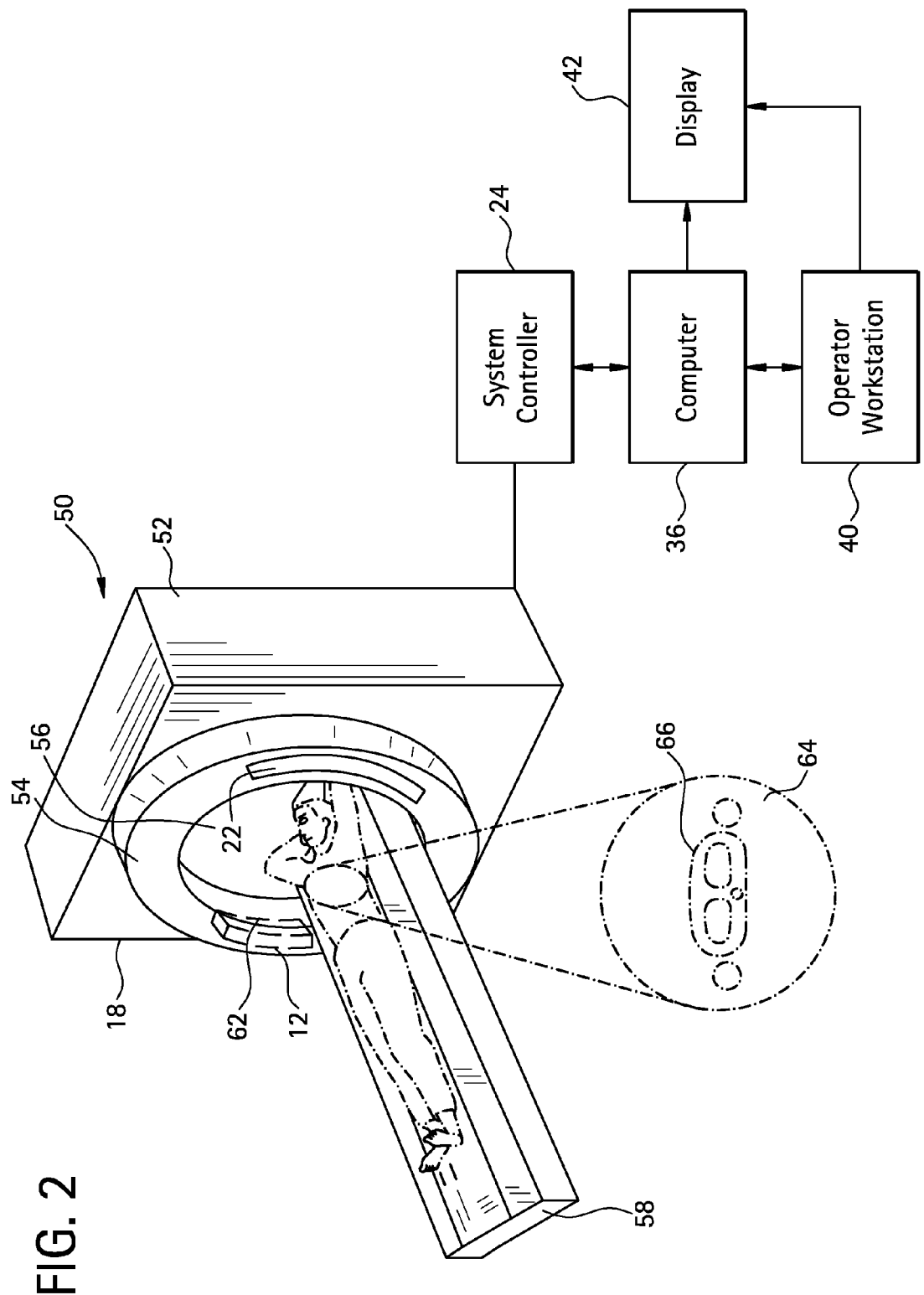

An example of the imaging system 10 allowing application of the invention is illustrated schematically in FIGS. 1 and 2.

In this example, this imaging apparatus is a CT tomography apparatus, though other techniques of imaging in volume (3D imaging) are also imaginable: for example, magnetic resonance imaging or position emission imaging.

In a classical manner this imaging system 10 is comprised of:

an X-ray source 12, a collimator 14, which defines the dimensions and the form of the beam 16 of the X-rays that cross a region in which a subject like a human patient 18 is set up, and a sensor 22, which receives the part 20 of the rays that cross the anatomy 18 on which one would like to complete the exam.

The sensor 22 may be a matrix of detectors, each of which generates and outputs an analog signal representing the intensity of incident X-rays. These signals are acquired and processed by reconstructing, in real time or almost real time, an image of the details of the subject. The signals are recorded in a classical manner according to various angles around the patient in a way to collect several radiographic views.

The source 12 is controlled by a control unit 24, which includes a command device 30 for X-rays, and that also controls, through the intermediary of a motorized control device 32, on the one hand the rotation movement of the source 12 and of the sensor 22 on the crossbar 52 that supports them (rotation system command 26), and on the other hand, the linear displacement of the be 58 that moves the patient in relation to the crossbar 52 (linear displacement system command 28).

In addition, the control unit 24 includes a system for acquisition of data 34 that receives the analog signals leaving the sensor 22 and the converts them to digital signals for further processing by a processor, for example, a computer 36. The computer 36 may include or communicate with a memory 38, which may store the data processed by the computer 36 or the data to be processed by the computer 36. It is not important what kind of available memory device is used for a computer that allows storage of the desired quantity of data and/or codes. Moreover, the memory 38 may be local or distant with regard to the system 10. The memory devices should be able to store the data, the processing parameters, and/or the computer programs to execute the various processes described here.

The computer 36 is typically used to monitor the imaging device 10. To this end, the computer 36 is configured to receive commands and acquisition parameters from an operator by the intermediary of work station 40, equipped in a standard manner with a mouse, a keyboard, and/or other peripherals.

A posting screen 42 linked to the work station allows the posting of the processed image. The image may also be printed by a printer 43, which may be connected to the work station. In addition, the work station may also be connected to a system 44 for the achieving and communication of images (PACS or "Picture Archiving and Communication" in English terminology). The PACS 44 may be connected to a distant system 46 so that other persons may access the image and the image data from a distance.

To be sure, this example in not all limiting, and each of the devices presented below may be connected to other devices, depending on the application that is desired.

The data collected by the sensor 22 typically are subject to correction, either pre-processing and/or distribution in the system of acquisition 34 and/or the computer 36, in order to package the data to represent the integrals of the coefficients of attenuation of the objects analyzed along the rays moving from the source of the detector. The processed data, commonly called projection images, may be used by a reconstruction algorithm. In tomography, one acquires a certain number of projection images, each from a different angle in relation to the subject and/or to the detector. The algorithms of tomographic reconstruction are well known by the person versed in the art, and allow formation of a three-dimensional image of the scanned images (images acquired in volume).

Decision Tree

There will now be described a pre-processing, which allows working on the acquired images by a 3D imaging system.

This pre-processing partitions the images acquired through the system 10—or through any other system of 3D imaging—in sub-volumes corresponding to the various parts of the anatomy of the body of the patient or of the part of the body of the patient that is the object of the acquisition: head, neck, thorax, lungs, heart, abdomen, lower members.

It also shows various organs or parts of organs that it might be desirable to isolate for examinations: lungs, heart, aortic arch, etc.

Figure 3A:
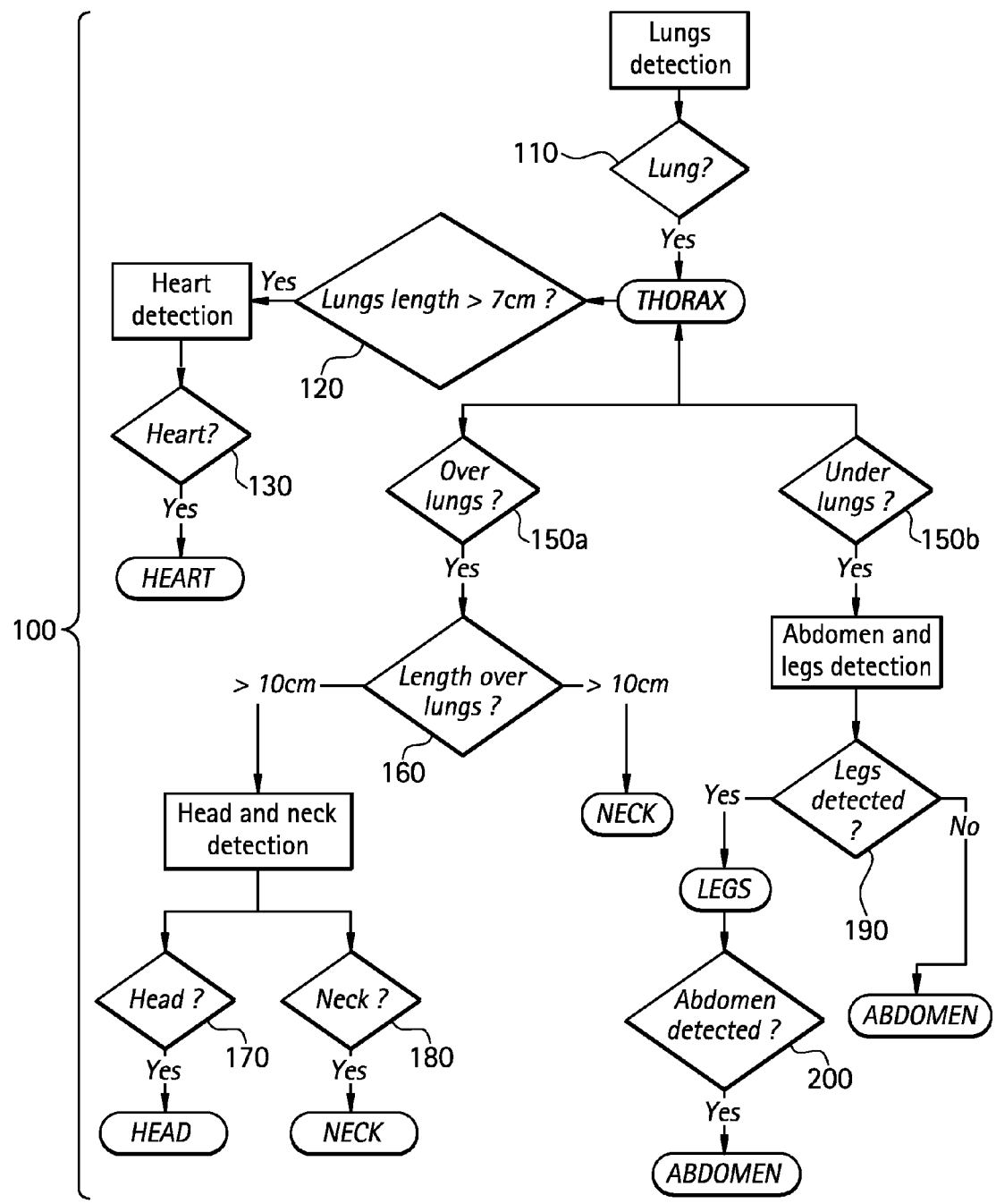
FIG. 3A illustrates a part of a decision tree that may be used in a possible action mode or application of the invention.
Figure 3B:
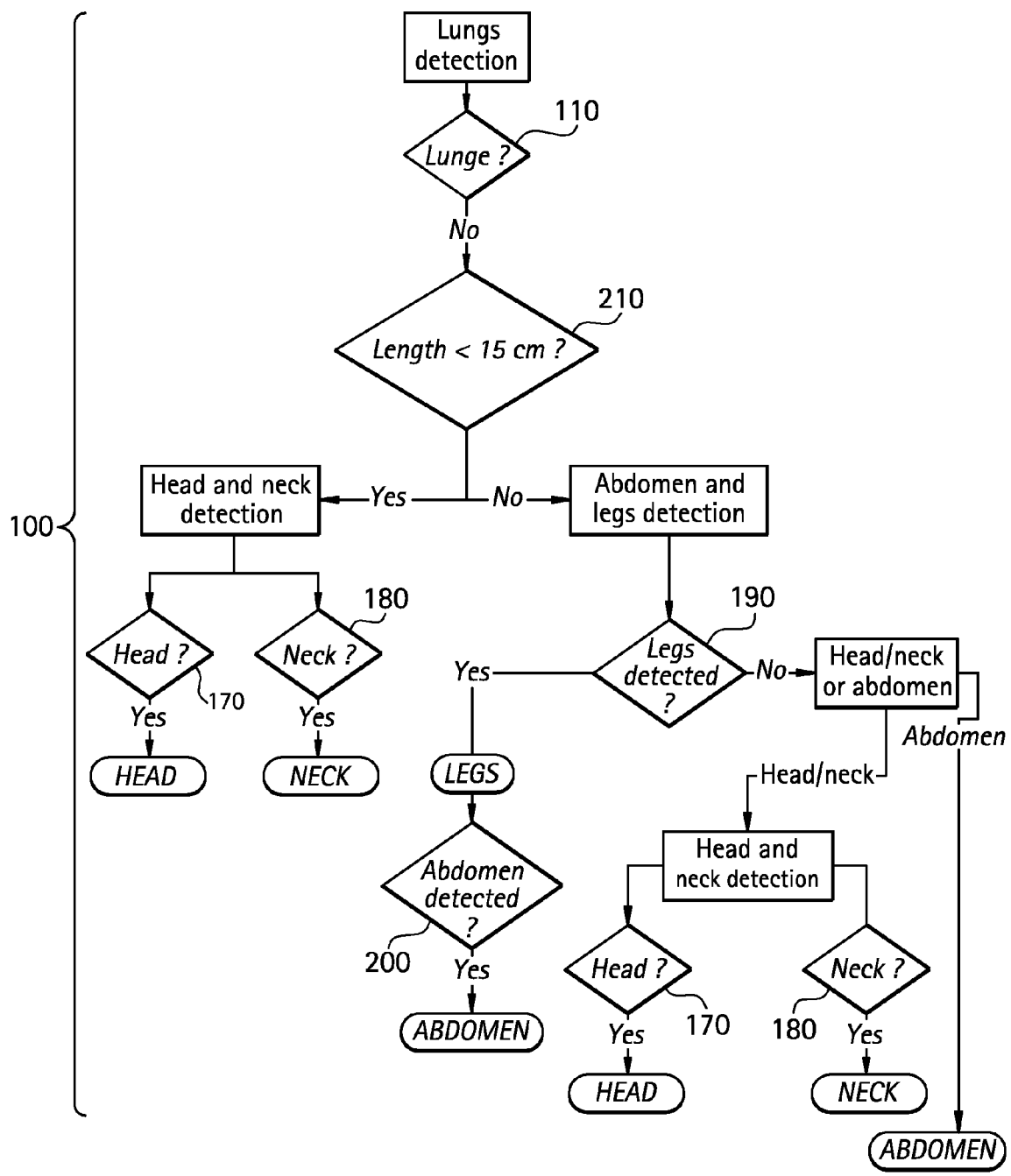
FIG. 3B illustrates another part of this decision tree.

To this end, this pre-processing moves forward according to the decision tree 100 that is illustrated in FIGS. 3A and 3B.

The principle of this decision tree consists in beginning to partition the images according to whether or not they include the lungs, and then to process the parts below and above the lungs.

Thus, in a first stage 110, the processing applies a test to detect the lungs on the images.

If the lungs are effectively detected on certain images, the acquired images are considered as being at least on the level of the thorax, and the decision tree moves along with the various steps illustrated on FIG. 3A.

The processing then applies a test 120 along the length of the lungs visible on the images, and compares this length to a given threshold length (for example, 7 cm).

When the length of the lungs is greater than this threshold length, the process applies an algorithm to detect the heart (test 130).

In parallel to test 120, tests 150a and 150b are also applied to the images, allowing the partitioning of the images that are found above and below the lungs.

For the images above the lungs, the processing applies a test along the length of the anatomy visible on the images and above the lungs, which it compares to a given threshold, for example, 10 cm.

If this length is greater than the given threshold, one then applies two tests 170 and 180 to detect respectively the head part and the neck part. In the contrary case, that is, if the length of the anatomy that is below the lungs and that is visible on the images is below the said threshold, the processing considers that it is only in the presence of the neck part.

For the images below the lungs, the process applies detection tests for the legs and the abdomen. Thus, if the legs are detected (test 190), the processing applies a test for the detection of the abdomen (200).

If the legs are not detected, the processing decides that the images are immediately at the level of the abdomen.

FIG. 3B illustrates the other part of the decision tree, for the case where the lungs are not detected when the processing applies test 110.

In this hypothesis, the processing applies a test 210 comparing the length of the part of the anatomy that is the object of the acquisition of images to a threshold length, which is, for example, 15 cm.

If this is above the said threshold, the processing applies tests 170 and 180, already called on in reference to FIG. 3A for the detection of the head part and neck part. The remainder of the images is considered to be part of the abdomen.

In contrast, if the length of the part of the anatomy found in the images is below the said threshold, the detection applies a detection of the legs by means of test 200, also already referred to.

Detection of the Lungs

Stage 100 of the detection of the lungs applies processing that allows the detection of air on the images, which is generally well defined on the histograms because it does not present a lot of attenuation (the smallest value of intensity of the histograms).

This processing in particular envisages identifying the other organs that can be understood by air on their interior in order to eliminate them, that is, to identify the exterior of body (the air around the patient often makes up part of the acquisition).

The stages of this processing are the following:

Thresholding the Volume (Stage 111)—A thresholding of the original volume is applied between −1023 H.U. and −500 H.U. in order to preserve the air.

Filtering the 3D Size (Size 112)—The closely related small-size 3D components are removed (in order to eliminate structures such as parts of the colon).

Detection and Separation of the Trachea (Stage 113)—The trachea connects the lungs with the air on the inside of the head. It starts in the throat and then moves to the larynx. It then continues on into the thorax. It is in the form of a horseshoe, in which the back wall is of muscle. The presence of the trachea and of the air in the head are quite bothersome when one wishes to detect the lungs. In order to allow the definition of the thorax from the lungs and to preserve for the thorax only the part of the body where the lungs are present, one should suppress the images of air corresponding to the trachea.

One should note that one way of detecting the trachea is to use its horseshoe shape, which at the level of the lungs moves to a more circular shape.

Thus, one measure of the degree of these circularities is taken into account due to the eccentricity, which is defined from these central moments:

$$\mu_{ij} = \sum_x \sum_y (x - \mu_x)^i (y - \mu_y)^j$$

The means are calculated as follows:

$$\mu_x = \frac{\sum_x x}{N} \quad \mu_y = \frac{\sum_y y}{N}$$

where N represents the size of the component, and the eccentricity can be expressed as follows:

$$e = \frac{\sqrt{(\mu_{20} - \mu_{02})^2 - 4\mu_{11}}}{\mu_{20} + \mu_{02}}$$

The parameter of this formula represent the central moments defined above.

This expression gives a measure for each closely related component (CC) appearing on the views of the slice; the closer the value approaches to 0, the more one can consider the corresponding closely related component to be circular, since the excentricity of a circle is 0.

A closely related component is a portion of a 2D or 3D image whose elements (pixels or voxels) are all inter-connected. Each segmented image may be decomposed into a list of independent interconnected components.

Processing the Detection of the Trachea

To detect the trachea, one uses processing of the images on an axial slice (2D images), that is, of perpendicular slices on the principal axis of the anatomy (axis parallel to the length of the table and called axis z in the text below. The stages are the following:

Evaluation of the Excentricity and the Size in 2D—The axial slices are reviewed, and a labeling of closely related components (stage 113*a*) is obtained from them. The eccentricity of each CC identified by this labeling (stage 113*b*) is calculated in order to save only those the CCs whose eccentricity is below a threshold (close to 0) and whose size is between $$\pi \cdot r_{min}^2 \text{ and } \pi \cdot r_{max}^2$$

(stage 113*c*).

Average Excentricities of 3D CCs—The mean of the excentricity of each 3D CC is then calculated, starting with the values of the 2D CCs that are part of them (stage 113*d*).

Length of the 3D CCs—The 3D CCs are saved whose average eccentricity is the smallest and whose length (on the z axis, that is, according to the axis of the body from which the images have been acquired) is above a threshold. This component should correspond to a part of the trachea (stage 113*e*).

Once detected (if it is present), it is subtracted from the threshold volume to separate the lungs from the air in the head and in the neck.

Selection of the Lungs: Use of Descriptors on the 3D CCs (Stage 114)

Several descriptors are used to correctly choose the CC or CCs corresponding to the lungs (they represent a closely related component if they are linked across the trachea). In particular:

Center of the masses: the lungs are almost centered on the image (whereas the air around the body is not so centered);

Length: a maximum length is taken into account (anatomic information);

Mean ($\mu$) and standard deviation ($\sigma$): the two lungs have similar statistics. The two values are calculated from the intensity of the voxels of each 3D CC; and Volume/length ratio: the residual parts of air that may remain on the interior of the body are eliminated by this ratio (which is very small in this case).

A first review of the components is made to choose candidates to test the position, the standard deviation (the lungs are relatively homogenous), the mean (never smaller than –900 H.U. for the lungs), and the volume/length ratio.

If a single candidate is found, it is taken to be the lungs. On the contrary, if several are chosen, one checks to see if the z coordinates of the centers are close (the lungs are situated at the same height) and if the means are close in order to save 2 CCs. If no CC meets these conditions, the CC that is chosen is the one whose volume/length ratio is the largest.

Choice of the First and Last Slice of the Lungs (Stage 115)

Once the lungs have been identified, it is necessary to choose the z values of the window that corresponds to them.

The choice for the lower limit is relatively simple: it suffices to keep the z value of the slice containing the last segment (the last voxel) of the lungs.

The choice of the upper limit is a function of the information available from the 2D axial slices, on which one may find:

a part of the trachea above the lungs and the two lungs;
a part of the trachea above the lungs and one lung;
either the two lungs;
or one lung.

When the presence of the two lungs is detected, their start is fixed as the first slice where two closely related 2D components appear. This gives good results in the case where the trachea is present above the lungs: the number of CCs will always be equal to 1 until arriving at the first slice of the lungs.

Moreover, when one lung is detected, the criterion applied is the following: a slice is considered as the beginning of the lungs if:

the total surface of the CCs on the slice is greater than a threshold (typically greater than the maximum air of the trachea);

the number of CCs is greater than 1, and the preceding condition has not been verified.

This allows a good fixing of the beginning when the trachea is present above the lungs, and above all allows avoidance of false detections when only one part of the lungs is contained in the examination (the lungs may be divided into more than 2 CCs because of the presence of other organs in the lower part).

FIGS. 5A to 5E illustrate different stages of the process of identification of the lungs. FIGS. 5A and 5B show the trachea and the lungs stacked in volume. FIGS. 5C to 5E show the results obtained that correspond to the lungs.

Detection of the Heart

Detection of the heart is based on the detection of the ascending and descending aorta in the same slice (which is found just at the beginning of the heart, below the aortic arch), thanks in particular to the circular form in which they present themselves). This slice is considered the beginning of the cardiac window and allows cutting the arch, resulting in improved cardiac algorithms, whose performance is very much influenced by its presence.

The vessels are injected with a contrast medium in order to make them stand out and to render them quite visible in relation to the other structures.

Figure 6:
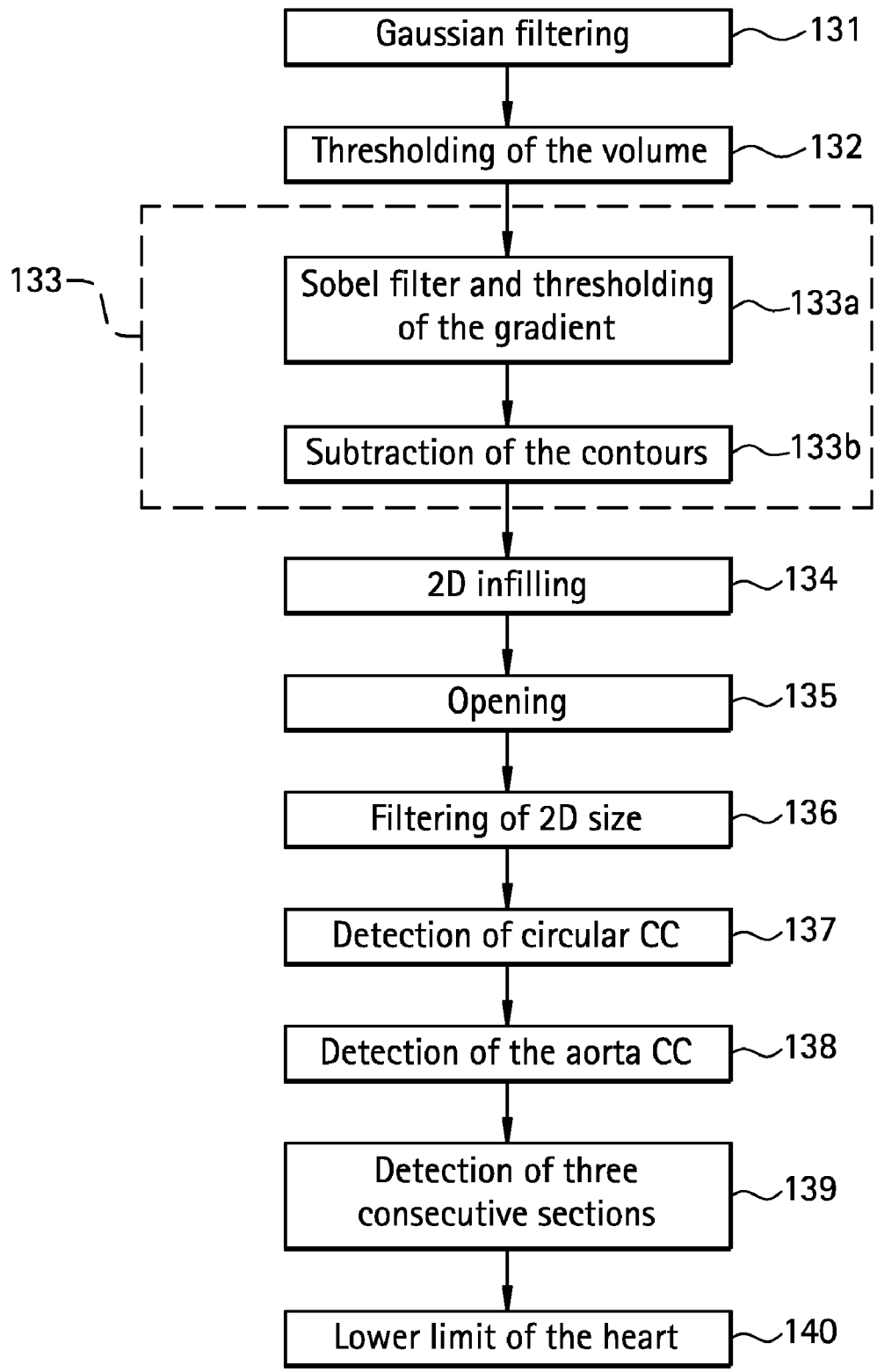
FIG. 6 illustrates stages of an example of processing to allow detection of a window around the heart.
Figure 7A:
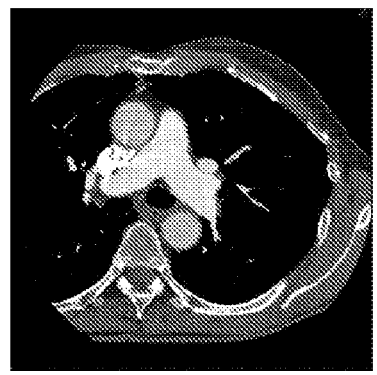
FIGS. 7A to 7G are images of a slice illustrating various stages of processing of the detection of the heart from FIG. 6.
Figure 7B:
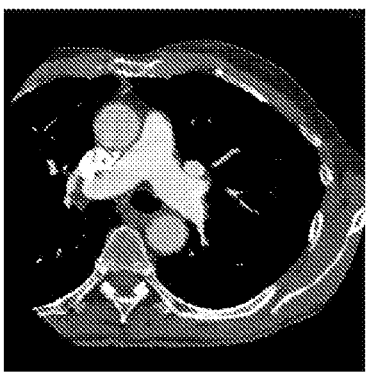

The various stages of the process of detecting the heart are illustrated in FIG. 6, the different images being obtained by applying to an image of a slice (FIG. 7A) various stages of such processing as represented in FIGS. 7B to 7G:

Gaussian Filter (Stage 131—FIG. 7B)

Many times the exams are noisy, and thresholding can generate holes inside the closely related components. The Gaussian filter allows a reduction of the noise, but it also makes the image blurrier (for example, by rendering the contours less sharp). The filter is expressed by the following:

$$G(x, y) = \frac{1}{\sqrt{2\pi}\,\sigma^2} \cdot e^{-\frac{x^2+y^2}{2\sigma^2}}$$

The value of $\sigma$ is chosen to allow removal of some of the noise without overly degrading the image.

Figure 7C:
Figure 7D:
Figure 7E:
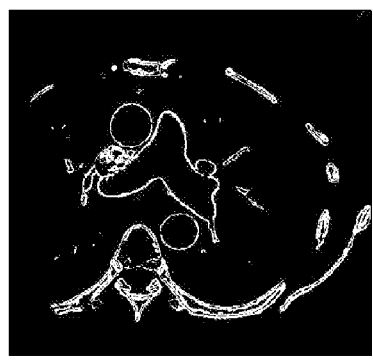
Figure 7F:

Thresholding the Volume (Stage 132—FIG. 7C)

The volume is thresholded between 120 H.U. and 750 H.U. to isolate the vessels. Nevertheless, other structures are present as well.

Subtraction of the Contours (Stage 133)

In most cases, thresholding is not sufficient to separate the aorta from its surroundings. However, despite the proximity in levels of gray, the gradient is not negligible and may be used. The contours are thus extracted to create a mask, which is subtracted from the thresholded volume. And so the structures, of which the interface is the most marked, will be separated from each other.

Sobel Filter and Thresholding of the Gradient (Stage 133a):

The gradient (FIG. 7D) is calculated by a Sobel mask. The values of the module are smaller on the interior of objects, since they are attenuated by the filtering (there is less noise). The contours are also a bit less thick and less important than if the filtering had not been applied. A threshold is chosen for the gradient, and as a result one keeps the contours only to create the subtraction mask (FIG. 7E corresponds to the image of the gradient after thresholding).

Subtraction of the Contours from the Volume (Stage 133b—FIG. 7F):

The mask is then subtracted from the thresholded image in a way that several structures are detached. This allows in particular the separation of the ascending aorta of the pulmonary aorta, which are often shoved closely together.

Filling in 2D (Stage 134)

Because of thresholding and the subtraction of contours, it is possible that holes appear, and it necessary to fill them in again.

Figure 7G:
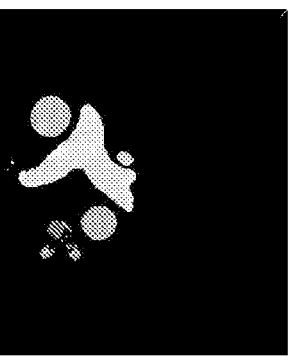
Figure 8:
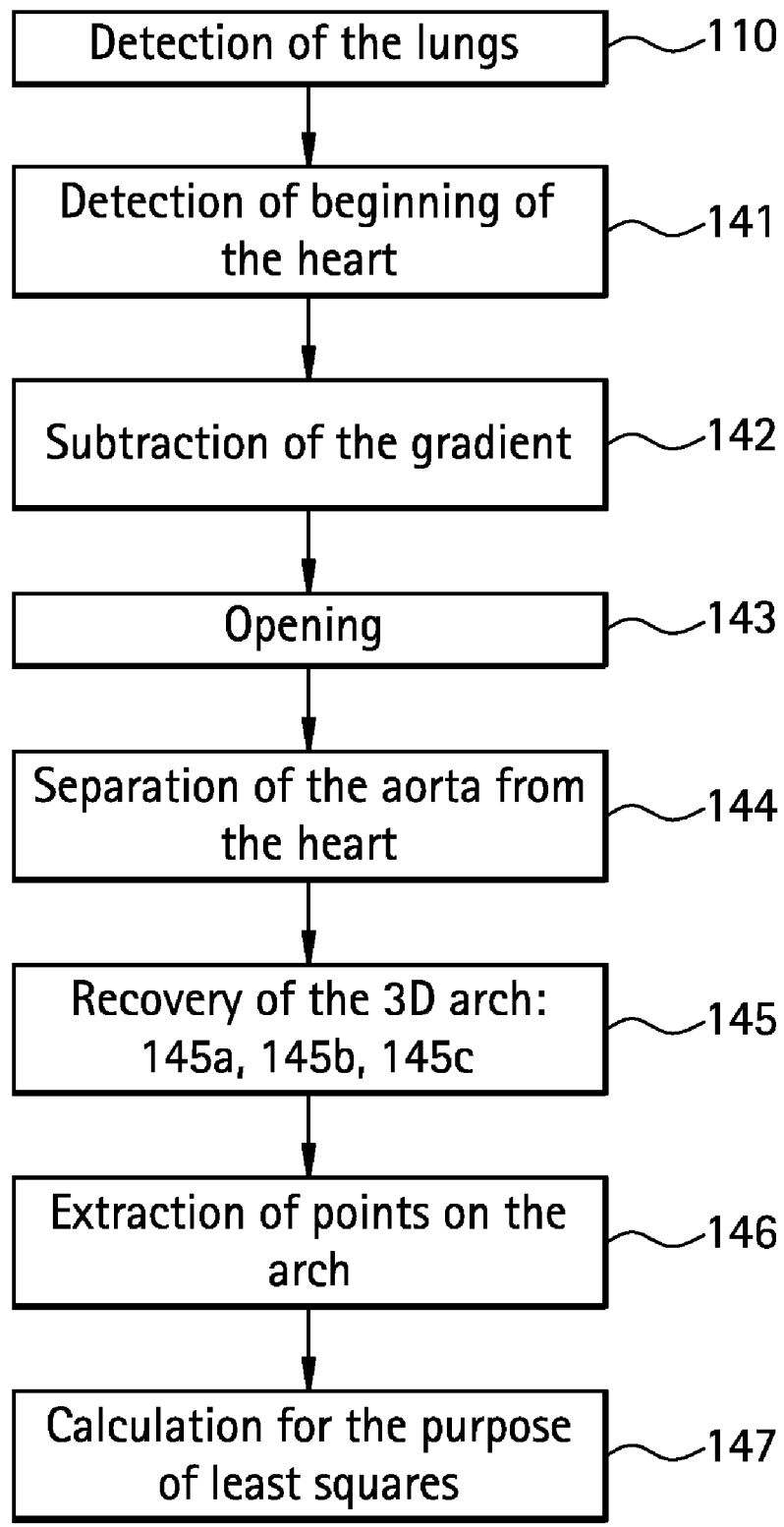
FIG. 8 illustrates processing to allow detection of the aortic arch.
Figure 9A:
FIGS. 9A to 9F are images of a slice illustrating various results coming from the detection of the aortic arch.
Figure 9B:
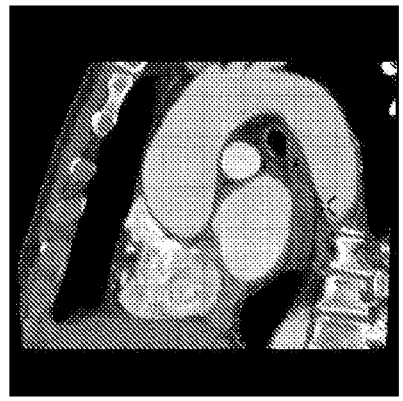
Figure 9C:
Figure 9D:
Figure 9E:
Figure 9F:
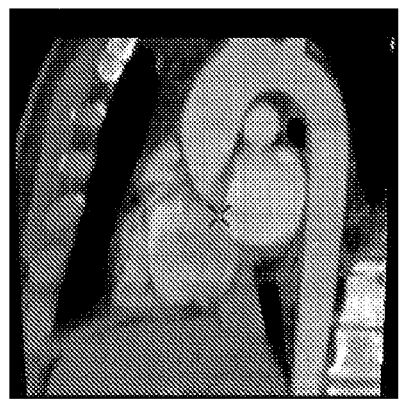
Figure 10:
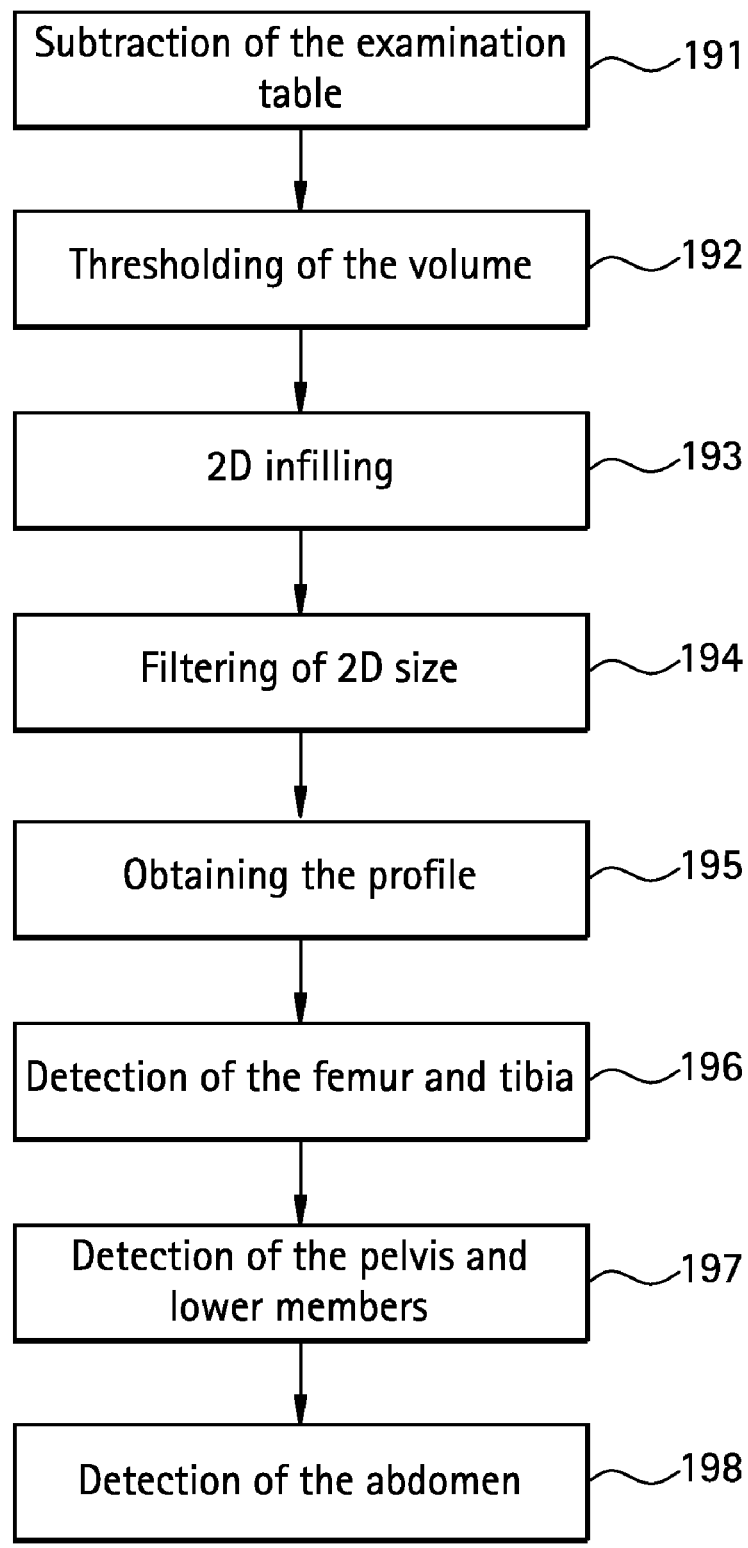
FIG. 10 illustrates the stages of processing to allow detection of the lower part of the body, in particular the abdomen and the legs.

Opening (Stage 135—FIG. 7G)

After the subtraction of the contours, there may still be little pieces stuck together on the aorta. This phenomenon makes the aortas less circular, and may disturb the measures of excentricity. An opening is applied with the goal of producing a smoothing effect around the structures.

In practice, the size chosen for the opening is:

$$\text{size (voxels)} = \text{size (cm) resolution (cm)}$$

Filtering the 2D Size (Stage 136)

This stage eliminates the smallest components that remain in the image that risk affecting the following stages. The size is fixed (in voxels) as $$\frac{\pi \cdot r_{min}^2}{\text{resolution}},$$

starting from the minimum ray considered for the aorta.

Detection of the Most Circular CC for each Slice (Stage 137)

Once the pre-processing is done, the CCs that remain are analyzed in order to extract and evaluate several descriptors:
  size;
  position;
  excentricity;
  mean ($\mu$) and standard deviation ($\sigma$) (the two values are calculated for the intensities of the voxels of each CC);
  distance between them.

For each slice, the component with the smallest excentricity is saved, if the variance is smaller than a threshold (the density of the contrast medium should be relatively homogeneous) and whose size is smaller than $$\frac{\pi \cdot r_{max}^2}{\text{resolution}} \text{ (maximum ray for the aorta)}.$$

Detection of the Second CC Corresponding to the Aorta (Stage 138)

After that, the rest of the CCs are reviewed, and distance is calculated for the previously recorded component and for the slope of the straight line connecting them. The second component for each slice is retained if:
  the eccentricity is below a threshold (close to 0);
  the distance is found in a fixed interval (starting from anatomic criteria);
  the slope is found in a fixed interval (the orientation of the patient may vary, but not by a great deal);
  the sizes are similar;
  the statistics are similar.

This allows saving only the ascending and descending aorta for each slice, but one may have isolated components that are selected (e.g., from one slice).

Detection of Three Consecutive Slices (Stage 139)

In order to avoid false findings, it has been decided to fix the beginning of the heart if there are three consecutive slices containing the two parts of the aorta. To do that, it should be verified that the centers of the CCs vary very little between the slices, and the first of the slices is taken as the beginning of the heart.

Choice of the Lower Limit of the Heart (Stage 140)

The lower limit for the window of the heart is not critical, since the fact of having extra information from below the heart has no effect at all on the performance of the protocols. Nevertheless, a limit must be fixed because of the calculation time. Since time and priorities did not permit this to be done, the limit is taken from the upper limit of the heart (the first slice of the heart) and by taking account of the lungs:

$$z_{max}coeur = \begin{cases} (z_{min}coeur + 16 \text{ cm}) & \text{si}(z_{min}coeur + 16 \text{ cm}) \leq z_{max}poumons \\ z_{max}poumons & \text{si}(z_{min}coeur + 16 \text{ cm}) > z_{max}poumons \end{cases}$$

coeur = heart poumons = lungs

Automatic Generation of a View Called "Candy Cane" (Aortic Arch)

The detection of the aortic arch is of great interest for physicians, for it allows one to easily diagnose illnesses related in particular to an aortic dissection.

As to be understood from the section below, the processing that is proposed to detect the aortic arch can be applied totally independently from the decision tree of FIGS. 3A and 3B.

This processing uses the identification of the first slice of the heart and of the centers of the ascending and descending aorta in this slice. Recognizing these centers allows recovery of the arch (as a 3D component). Then one extracts from the arch a succession of points corresponding to various centers of the ascending and descending aorta, with the group of points so constituted being used to calculate the median plane of the aortic arch, a plane on which one obtains the so-called "candy cane" view.

More precisely, the stages of this processing are the following:

Detection of the Lungs (Stage 110)

This stage is optional, but it permits a reduction of the calculation time and allows the ability to process volumes with a large coverage of z.

Detection of the Upper Limit of the Heart (Stage 141 Corresponding to Stages 137 to 139)

The centers of the ascending and descending aortas are saved, and they become part of the calculations of the plane, serving to obtain other points.

Subtraction of the Gradient (Stage 142)

Once the beginning of the heart has been detected (as a 3D component), the arch may be pushed together with the pulmonary arteries above the slice taken as the beginning of the heart. To avoid this, a thresholding of the gradient is made that is less restrictive (more contours are kept), and it is subtracted from the volume. Even though this stage generates holes in the interior of the aorta, they are not troublesome for what comes later because the points on the aorta are continuously preserved.

Opening Starting With the Chart of 3D Distances (Stage 143)

There are many branches that leave the aorta and make up part of the arch (of the 3D CC). These points may shift the calculated plane forward, and so they are removed by an opening of size n starting with the chart of 3D distances. In other words, the chart of distances is calculated, and those voxels are removed whose distance to the bottom is smaller than or equal to n. Then a dilatation is applied with the same principle.

Separation of the Aorta From the Heart (Stage 144)

The descending aorta leaves the heart, and it is necessary to separate it from the arch. Since the 2D ascending aorta has already been found on the slice at the beginning of the heart, one may subtract it from the volume and thus to separate it from the heart.

Retrieval of the 3D Arch (Stage 145)

Aside from the arch, there are other 3D structures. The arch is selected in the following way:

retrieval of the 3D CC (component closely related in volume) containing the point previously calculated on the ascending aorta (stage 145a); retrieval of the ascending part of the arch (or of the entire arch);

retrieval of the 3D CC containing the point previously calculated on the descending aorta (stage 145b); retrieval of the ascending part of the arch (or of the entire arch);

combination of the two components (stage 145c) (the arch sometimes may be cut into 2 CCs due to the preceding stages).

At the end of this stage, what has been saved contains either the entire arch (1 CC) or the two independent parts (2 CCs).

Extraction of Points on the Arch (Stage 146)

The n points are extracted starting from a 2d axial labeling of the arch while retrieving the centers of each 2D component.

Calculation of the Plane by Least Squares (Stage 147)

The system so obtained is overdetermined. The distances of the points on the plane are minimized using least squares.

FIGS. 9A to 9F illustrate different results from the calculation of the "candy cane" view.

Detection of the Abdomen and the Lower Members

The detection of the anatomies found below the lungs is based on the projection of the density of the bones along the z axis. Thus, the curve traced from the surface of the bone on each slice is analyzed.

As understood by reference to FIGS. 3A and 3B, on the one hand, if the lungs are detected (FIG. 3A), the profile is calculated based on the last slice of the lungs (partitioning of stage 150b). On the other hand, if they are not present (FIG. 3B), the profile will contain at a maximum the abdomen and the legs.

Subtraction of the Exam Table (Stage 191)

First of all, it is necessary to remove the exam table because its density is close to that of the bones. A function that has already been implemented is used to do this.

Thresholding the Volume (Stage 192)

The volume is thresholded starting at 120 H.U. to save the parts that are of interest.

Filling in 2D (Stage 193)

It is necessary to fill in some holes that appear on some boney parts in order to avoid having discontinuities. This may occur at the hip level or on the disks of the vertebral column.

Filtering the 2D Size (Stage 194)

Filtering the size with the goal of removing isolated voxels, small vessels, or parts of organs having a density above 120 H.U.

Obtaining the Profile (Stage 195)

All the voxels are summed that remain on each slice in order to obtain the surface using the following formula:

$$\text{Surface}(cm^2) = n \cdot \text{res}_x(cm) \cdot \text{res}_y(cm)$$

where n is the number of voxels, and $\text{res}_x$ and $\text{res}_y$ are the resolutions in x and y.

In the profile, the y axis represents the surface, and the x axis represents the position (either in mm or in slices). Nevertheless, the curve obtained is quite noisy and irregular because parts are still saved that are not from the bones and above all because of the filling in. In effect, sometimes the filling does not succeed in closing the holes if the contours are not closed, and the surface in this case is going to be smaller.

Research and characterization of the maxima and minima on a noisy curve may be facilitated with a 1D Gaussian filter. This allows saving only the values that are extremely important and allows removal of the noise.

Figure 11:
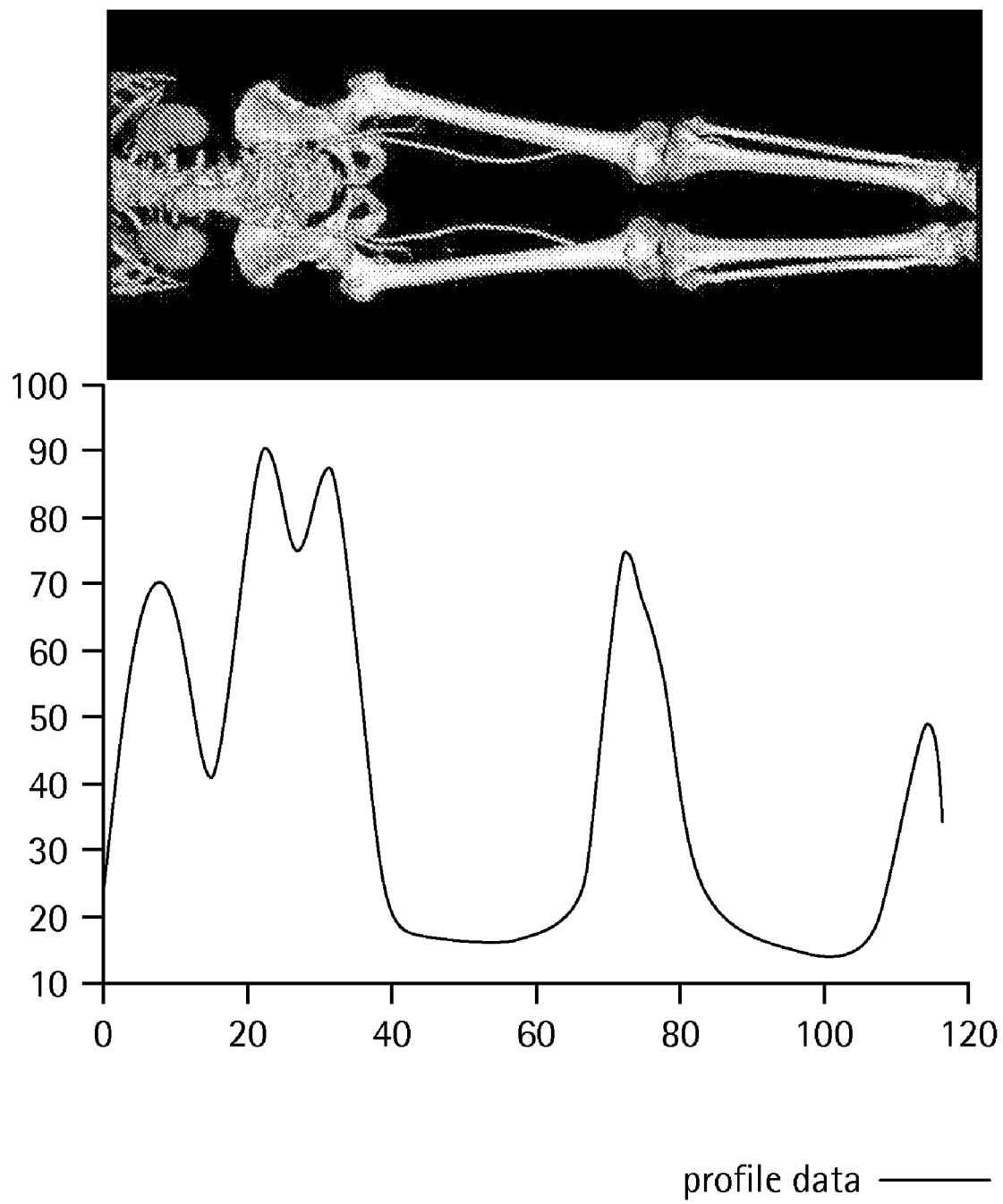
FIG. 11 illustrates the correspondence between a profile obtained from applying the processing of FIG. 10 and various bones of the lower members and of the abdomen.
Figure 12:
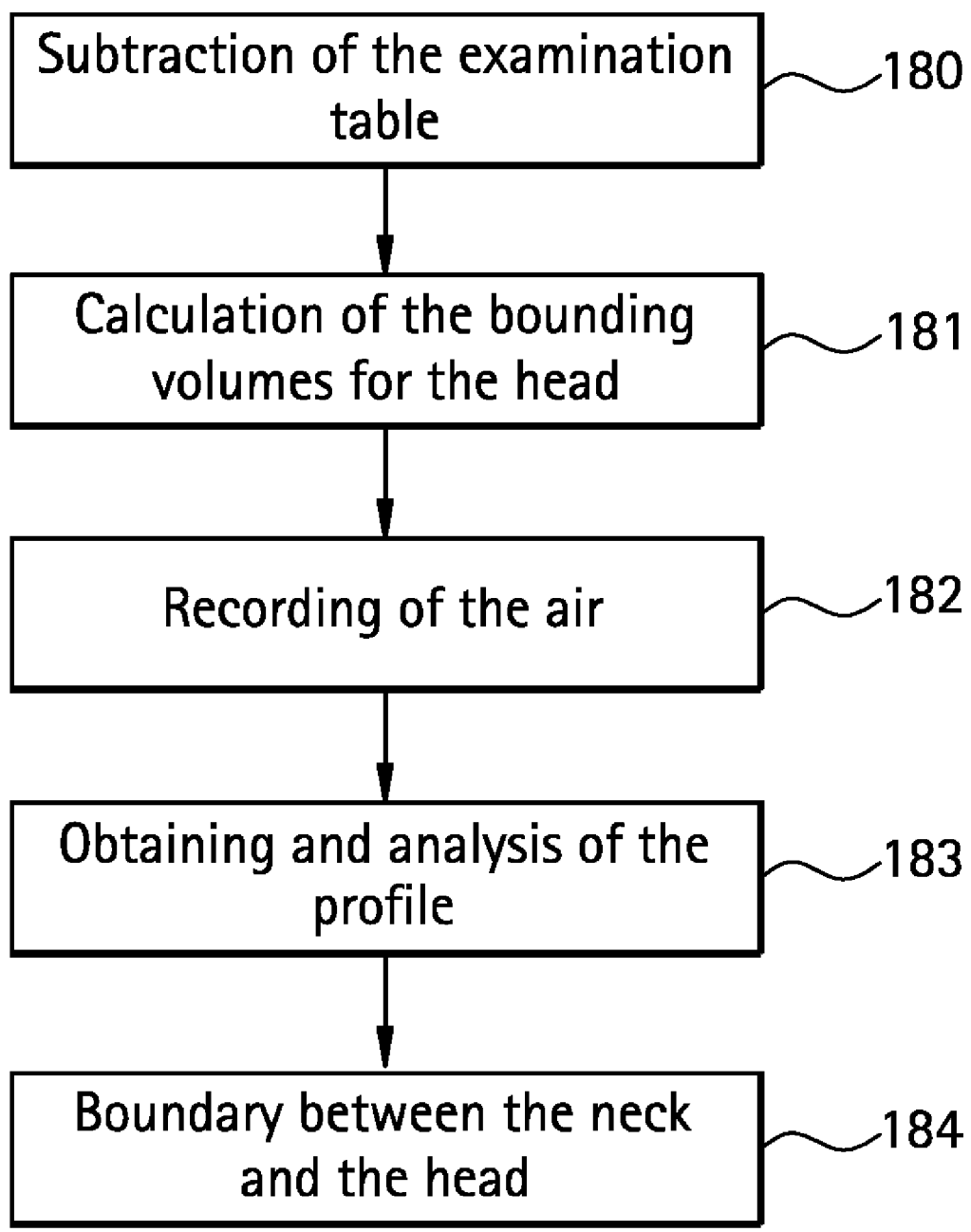
FIG. 12 illustrates the different stages of processing to allow the detection of the upper part of the body, particularly the head and the neck.

After filtering, the curve is more vivid and representative of the anatomy. One may identify several zones of interest (FIG. 11), namely:

the femur,
the tibia,
the pelvis,
the knees,
the feet.

From the point of view of the protocols of Volume Viewer, all these parts belong to the same anatomy: Lower members. Moreover, the hip is also part of the anatomy of the abdomen.

The femur and the tibia correspond to the valleys of the curve; logically, the maximum between them is the knees. At the end of the curve and after the tibia come the feet (last maximum). The two maxima nearest to the left of the femur form part of the pelvis. Effectively, on one of them the upper part of the hip is identified, and on the other, the lower part (up to the head of the femur).

Detection of the Femur and of the Tibia (Stage 196)

Once the curve has been obtained, the first parts to be detected are the femur and the tibia. One of the reasons for doing this is that one may detect the valleys independently from the relative position on the volume, since they appear only on the femur and the tibia. That would be much more difficult for the maxima. Moreover, the position of the femur is used to identify the maxima correctly. With regard to the algorithm, a valley is defined as a profile region where:

the values are below a threshold (the surface is bound to be smaller);
it has a determined length;
the values are very close to one another all along the length of the valley;

there are no strong variations between the consecutive values (the derivative is small).

Detection of the Pelvis and Beginning of the Lower Members (Stage 197)

The detection of the femur serves as a reference point on the lower part of the body. This information is useful to identify the pelvis and to fix the beginning of the anatomy of Lower members. In effect, one is going to try to localize the two maxima on the left of the legs by reviewing the profile in an inverse sense, starting from the beginning of the femur. The conditions for the maxima being retained are:

the value has to be above a threshold (for example, the surface is large on than on the legs);

the distance between the maximum and the beginning of the femur has to be smaller than a certain maximum distance (use of the anatomic information).

Three possibilities exist: keep two maxima, keep one maximum, keep nothing. In the first case, one will establish the beginning of the lower members, at a minimum the closest to the left of the last maximum (just above the pelvis). If only one maximum is retained, one proceeds analogously to the preceding case because the maximum found high up on the pelvis is often more robust. Finally, if no maximum has been found, it is considered that all are part of the lower members.

Detection of the Abdomen (Stage 198)

Based on the data obtained with the profile of the bones, one cannot process this directly to detect the abdomen, but rather a decision is made on this part. If the legs, the pelvis, and the beginning of the lower members are correctly identified, it may be said without risk that all the slices found above the lower members (the lungs are not included) belong to the abdomen. Moreover, the lower limit of the abdomen is fixed on the beginning of the femur.

Results obtained of the images of the abdomen or of the lower members are also illustrated there on the Figures.

Detection of the Head and the Neck

Detection of the head and neck is based on the air on the interior of each of them.

Subtraction of the Exam Table (Stage 180)

Subtraction of the table is an important point for the calculation of the encompassing box because it is very much simpler if the only 2D structure that remains is the head or the neck.

Calculation of the Encompassing Boxes for the Head and Neck (Stage 181)

Thresholding is applied to remove the air, and then the largest 2D CC on each slice is selected (which should correspond to the head or the neck). The various CCs obtained are reviewed, and for each the couples $(x_{min}, x_{max})$ and $(y_{min}, y_{max})$ are saved; the combinations represent the corners of the box.

The boxes serve us as an approximation to be able to determine if an object is found inside another object (for example, the air and the head).

Recording of the Air on the Inside of the Boxes (Stage 182)

The boxes thus calculated are compared to those of the air of the inside of the body (head/neck). The air is saved with a thresholding between −1023 H.U. and −500 H.U.; for each 2D CC, the center of the mass and its encompassing box is calculated.

A component is in the end retained if:
its encompassing box is contained in the encompassing box of the head or neck;
the center of the mass is almost centered on the image (if one considers that the acquisition normally must contain most of the head, then air must be centered).

The components that remain after the selection correspond to the air on the inside (for example, sinus or trachea).

Obtaining and Analyzing the Profile of the Air (Stage 183)

A profile is obtained in a manner analogous to that used for the calculation of the density of the bones. The analysis of this profile (FIG. 13) allows having a physical reference to the sinuses, thanks to the obtaining of the maximum of the curve, since logically this maximum is always found at the same place on the head. To correctly detect it, a Gaussian filter is applied to the original curve.

Limit Between the Neck and the Head (Stage 184)

Once the maximum is detected, the value in z is saved where the surface falls to 30%. This value in z is taken as the beginning of the neck (whose lower limit is the beginning of the lungs). Moreover, the lower limit of the head is fixed 2 cm below the beginning of the neck (and so there will be a small common part of the two anatomies).

Various Embodiments

The following paragraphs further describe varoius embodiments of the invention set forth above.

Method for the treatment of anatomical volume images acquired by a medical imaging system, according to which the images are partitioned into sub-volumes corresponding to various anatomical parts identified on said images, characterised in that, to perform this partitioning, the acquired images are treated to identify the lungs on them and in that, if the lungs are identified, the upper and lower sections delimiting them along the axis of the anatomy on which the images have been acquired are determined and a distinct treatment is implemented on the images corresponding to the anatomical areas above and below these two sections respectively.

Method as recited in paragraph [0142], characterised in that, to identify the lungs on the images, a treatment aimed at subtracting the air in the trachea of the images is implemented according to which:

the various closely-related components of air that appear on the acquired images are determined,
an average 3D eccentricity is determined for them,
the average 3D eccentricities thus calculated are compared to a threshold to preserve only those of these closely-related components whose 3D eccentricity is less than a first threshold and whose length along the z axis is greater than a second threshold, the closely-related components thus isolated being then subtracted from the images.

Method as recited in paragraph [0143], characterised in that a thresholding is implemented beforehand, as well as a filtering on the size of the closely-related components.

Method as recited in one of paragraphs [0142]-[0144], characterised in that from among various candidate closely-related components a closely-related component is selected corresponding to the lungs as a function of at least one of the following descriptors: centre of mass, length, mean and standard deviation, volume/length ratio.

Method as recited in one of paragraphs [0142]-[0145], characterised in that, to determine the section corresponding to the lower limit of the lungs, the axial sections are gone through from the bottom of the anatomy toward the top and the first section on which a voxel of the lungs appears is determined.

Method as recited in one of paragraphs [0142]-[0145], characterised in that, to determine the section corresponding to the upper limit of the lungs when the presence of two lungs is detected, the axial sections are gone through from the top of the anatomy toward the bottom and the first section on which two closely-related components appear is determined.

Method as recited in one of paragraphs [0142]-[0145], characterised in that, to determine the section corresponding to the upper limit of the lungs when the presence of two lungs is detected, the axial sections are gone through from the top of the anatomy toward the bottom and the first section on which the total surface area of the closely-related components is greater than a given threshold is determined.

Method as recited in paragraph [0148], characterised in that, in the absence of a section on which the total surface area of the closely-related components is greater than said threshold, the first section for which the number of closely-related components is greater than 1 is determined.

Method as recited in one of the preceding paragraphs [0142]-[0149], characterised in that, when the lungs are detected, a treatment for the purpose of identifying and partitioning the images corresponding to the heart is implemented.

Method as recited in paragraph [0150], characterised in that the length of the anatomy appearing on the images is compared beforehand to a given threshold, said treatment for the purpose of identifying and partitioning the images corresponding to the heart being implemented only when said length is greater than said threshold.

Method as recited in one of paragraphs [0149]-[0151], characterised in that, to determine the section corresponding to the upper limit of the heart, at least one axial section is determined on which the ascending aorta and the descending aorta are identified.

Method as recited in paragraph [0152], characterised in that, to determine the section corresponding to the upper limit of the heart, at least three successive axial sections are determined on which the ascending aorta and the descending aorta are identified.

Method as recited in one of paragraphs [0149]-[0153], characterised in that, to identify an aorta on an axial section, the closely-related components on said section are identified, among these the closely-related component whose eccentricity is the smallest is selected and the variance and the size of this component are compared, respectively, to a threshold variance and a maximal expected radius for the aorta, this component being considered as an aorta only if its variance and its size are less than said variance and said maximal radius.

Method as recited in paragraph [0154], characterised in that to identify another aorta on a section on which a first closely-related component has already been identified as corresponding to an aorta, the closely-related components of the section are gone through and their distances with respect to the first component are calculated as well as the slope of the straight line connecting them, and a closely-related component is selected whose eccentricity is below a given threshold, the distance and the slope determined for this closely-related component being found within given intervals.

Method as recited in paragraph [0155], characterised in that, to identify another aorta, the size and the statistics of the closely-related components are compared to the values of size and statistics as a function of those of the closely-related component identified as corresponding to the first aorta.

Method as recited in one of paragraphs [0149]-[0156], characterised in that a treatment is implemented on the images beforehand, comprising the following steps:
Gaussian filtering,
thresholding of the volume,
subtraction of the contours.

Method as recited in paragraph [0157], characterised in that said treatment also comprises the following steps:
opening,
2D filtering.

Method as recited in one of the preceding paragraphs [0142]-[0158], characterised in that, when the lungs are detected, an axial profile is determined of the surface occupied by the voxels on the sections below the lower limit section of the lungs and the presence of the abdomen and various parts of the legs is determined by analysing this profile.

Method as recited in one of the preceding paragraphs [0142]-[0159], characterised in that, when the lungs are not detected, the length of the anatomy that was the subject of the acquisition of the images is compared to a threshold and if this length is greater than said threshold, an axial profile is determined of the surface occupied by the voxels on the sections and the presence of the abdomen and various parts of the legs is determined by analysing this profile.

Method as recited in paragraph [0160], characterised in that, when the analysis of the profile does not make it possible to determine the presence of the abdomen and various parts of the legs, an axial profile is determined of the air appearing on the sections and this profile is analysed to deduce information from it on the area of the head or neck present on the images.

Method as recited in one of the preceding paragraphs [0142]-[0161], characterised in that, when the lungs are detected, an axial profile is determined of the air appearing on the sections above the upper limit section of the lungs and this profile is analysed to deduce information from it on the area of the head or neck present on the images.

Method as recited in paragraph [0162], characterised in that the length of anatomy above the upper limit section of the lungs is compared beforehand to a given threshold, the determination of the axial profile of the air being implemented only when said length is greater than said threshold.

Method as recited in one of the preceding paragraphs [0142]-[0163], characterised in that, when the lungs are not detected, the length of the anatomy that was the subject of the acquisition of images is compared to a threshold and if this length is less than said threshold, an axial profile is determined of the air appearing on the sections and this profile is analysed to deduce information from it on the area of the head or neck present on the images.

Method for the treatment of volume images acquired by a medical imaging system, characterised in that:
the axial sections perpendicular to the axis of the anatomy are gone through to identify an axial section corresponding to an upper limit for the heart,
two closely-related components corresponding to the ascending aorta and the descending aorta are determined on this section,
the components closely-related in volume which correspond to these closely-related components are determined,
said components closely-related in volume are merged,
determination is made on the component closely-related in volume thus obtained of the centres of the closely-related components which correspond to it on a plurality of the axial sections,
a plane optimising a distance with respect to the cloud of points constituted by these various centres is determined.

Medical imaging system comprising means for acquisition of anatomical volume images and means for treatment of these images suitable for partitioning the images into sub-volumes corresponding to various anatomical parts identified on said images, characterised in that said means comprise means suitable for implementing the treatment method as recited in one of the preceding paragraphs [0142]-[0165].

Program stored on means suitable for being read by a computer, characterised in that it comprises data and/or instructions for implementing a method as recited in one of paragraphs [0142]-[0165].

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the scope of the following claims.

The invention claimed is:

1. A method for treating anatomic images acquired in volume by a medical imaging system that partitions the anatomic images into sub-volumes corresponding to different parts of an anatomy identified on said acquired anatomic images, the method comprising:
  identifying the acquired anatomic images on which a lung appears, said identifying step including processing the acquired anatomical images to remove the air in a trachea from the images, said processing step including
    determining closely related components of air that appear on the acquired anatomical images;
    determining an average 3D eccentricity for the determined closely related components of air;
    comparing the average 3D eccentricities so calculated with a threshold to preserve only the closely related components whose 3D eccentricity is less than a first threshold, and whose length on a z axis is greater than a second threshold; and
    subtracting the closely related components thus isolated from the acquired anatomical images;
  determining lower and upper slices;
  delimiting the lower and upper slices according to an axis of the anatomy from which the anatomic images have been acquired, and
  applying a distinct processing to portions of the acquired anatomic images that correspond to anatomic zones respectively above the lower slice and below the upper slice.

2. The method of claim 1, further comprising:
applying a thresholding in advance; and
filtering the closely related components by size.

3. The method of claim 1, further comprising:
selecting a closely related component corresponding, to the lungs as a functioning of at least one of the following: center of mass, length, average, standard deviation, ratio of volume to length.

4. The method of claim 1, wherein to determine the slice corresponding to a lower limit of the lungs, the method further comprises:
  reviewing axial slices of the anatomy from bottom to top; and
  determining a first slice on which a voxel of the lungs appears.

5. The method of claim 1, wherein to determine the slice corresponding to an upper limit of the lungs when the presence of two lungs is detected, the method further comprises:
  reviewing axial slices of the anatomy from top to bottom; and
  determining a first slice on which two closely related components appear.

6. The method of claim 1, wherein to determine the slice corresponding to an upper limit of the lungs when the presence of two lungs is detected, the method, further comprises:
  reviewing axial slices of the anatomy from top to bottom; and
  determining a first slice on which a total surface of the closely related components is greater than a given threshold.

7. The method of claim 6, wherein in the absence of a slice on which the total surface of closely related components is greater than the said given threshold, the method further comprises:
  determining, a first slice for which the number of closely connected components is greater than 1.

8. The method of claim 1, wherein when the lungs are detected, the method further comprises:
  identifying and partitioning the acquired anatomical images which correspond to the heart.

9. The method of claim 8, further comprising:
  previously comparing a length of the anatomy appearing on the acquired acquisition images to a given threshold; and
  identifying and partitioning the acquired anatomical images which correspond to the heart only when said length is greater than the said given threshold.

10. The method of claim 8, wherein to determine a slice corresponding to an upper limit of the heart, the method further comprises:
  determining at least an axial slice on which an ascending and descending aorta are identified.

11. The method of claim 10, wherein to determine the slice corresponding to the upper limit of the heart, the method further comprises:
  determining at least three successive axial slices on which the ascending and descending aorta are identified.

12. The method of claim 8, wherein to identify an aorta on an axial slice, the method further comprises:
  identifying closely related components on said axial slice;
  selecting from among, them a closely related component whose eccentricity is smallest;
  comparing a variance of this selected closely related component to a threshold variance;
  comparing a size of this selected closely related component to a maximum ray expected for the aorta; and
  considering the selected closely related component as an aorta only if its variance is less than said threshold variance and its size is less than said maximum ray.

13. The method of claim 12, wherein to identity another aorta on a slice on which a first closely related component has already been identified as corresponding to an aorta, the method further comprises:
  reviewing the closely related components of the slice;
  calculating their distance with relation to the first component as well as calculating slope of the straight line connecting them;

selecting a closely related component from the closely related components of the slice whose eccentricity is below a given threshold when the distance and slope calculated for this selected closely related component are within given intervals.

14. The method of claim 13, wherein, to identify another aorta, the method further comprises:
comparing values of the size and statistics of the closely related components to values of the size and statistics that are a function of the closely related component identified as corresponding to the first aorta.

15. The method of claim 8, further comprising:
previously applying to the acquired anatomical Images one or more of the following:
a Gaussian filter,
a thresholding of the volume, and
a subtraction of the contours.

16. The method of claim 15, wherein said processing further comprises:
opening, and
2D filtering.

17. The method of claim 1, further comprising:
when the lungs are detected, determining an axial surface profile occupied by the voxels on the slices below the lower slice limit of the lungs; and
determining a presence of the abdomen and of various parts of the limbs in analyzing, the axial surface profile.

18. The method of claim 1, wherein when the lungs are not detected, the method further comprises:
comparing the length of the anatomy that is the object of the acquisition of the images to a threshold;
wherein if this length is greater than the said threshold, the method further comprises:
determining an axial profile of the surface occupied by the voxels on the slices, and
determining a presence of the abdomen and various parts of the legs in analyzing the axial profile.

19. The method of claim 17, wherein when the analysis of the profile does not allow determination of the presence of the abdomen and of various parts of the legs, the method further comprises:
determining an axial profile of the air appearing on the slices, and
analyzing the axial profile of the air to deduce from it information about a zone of a head or a neck present on the acquired anatomical images.

20. The method of claim 1, wherein when the lungs are detected, the method further comprises:
determining an axial profile of air appearing on the slices above the upper slice limit of the lungs; and
analyzing this axial profile of air to deduce from it information about a zone of a head a neck present on the acquired anatomical images.

21. The method of claim 20, further comprising:
previously comparing a length of the anatomy above the upper slice
limit of the lungs to a given threshold, and determining the axial profile of the air only when the said length of the anatomy is greater than said given threshold.

22. The method of claim 1, wherein when the lungs are not detected, the method further comprises:
comparing a length of the anatomy that is the object of the acquisition of the images to a threshold, and if this length is less than said threshold,
determining an axial profile of the air appearing on the slices; and
analyzing the axial profile of air to deduce from it information about a zone of a head or a neck present on the images.

23. A method, comprising:
reviewing axial slices perpendicular to an axis of an imaged anatomy to identify an axial slice corresponding to an upper limit of a heart;
determining two closely related components corresponding to an ascending aorta and a descending aorta on the identified axial slice;
determining components closely related in volume that correspond to the closely related components;
combining the said determined components closely connected in volume;
determining on the component closely connected in volume thus obtained centers of the closely connected components that correspond to it on a multiplicity of axial slices; and
determining a plan to optimize a distance with relation to the clouds of points made up by the various centers.

* * * * *